United States Patent
Jackson (10) Patent No.: US 9,297,639 B2
(45) Date of Patent: Mar. 29, 2016

(54) MECHANISM FOR MOVEMENT OF A MIRROR IN AN INTERFEROMETER, AN INTERFEROMETER INCORPORATING THE SAME AND A FOURIER TRANSFORM SPECTROMETER INCORPORATING THE SAME

(71) Applicant: Richard Jackson, Nashua, NH (US)

(72) Inventor: Richard Jackson, Nashua, NH (US)

( * ) Notice: Subject to any disclaimer, the term of this patent is extended or adjusted under 35 U.S.C. 154(b) by 0 days.

(21) Appl. No.: 14/263,031

(22) Filed: Apr. 28, 2014

(65) Prior Publication Data

US 2014/0327914 A1 Nov. 6, 2014

Related U.S. Application Data

(60) Provisional application No. 61/818,009, filed on May 1, 2013.

(51) Int. Cl.
*G01B 9/02* (2006.01)
*G01J 3/45* (2006.01)
*G01J 3/02* (2006.01)
*G01J 3/453* (2006.01)

(52) U.S. Cl.
CPC ........... *G01B 9/02049* (2013.01); *G01J 3/0202* (2013.01); *G01J 3/0237* (2013.01); *G01J 3/4535* (2013.01)

(58) Field of Classification Search
CPC .. G01B 9/02049; G01J 3/0202; G01J 3/0237; G01J 3/45; G01J 3/453; G01J 3/4535
See application file for complete search history.

(56) References Cited

U.S. PATENT DOCUMENTS

| 4,828,367 | A | 5/1989 | Curbelo et al. |
| 5,309,217 | A | 5/1994 | Simon et al. |
| 5,486,917 | A | 1/1996 | Carangelo et al. |
| 5,896,197 | A | 4/1999 | Coffin |
| 2002/0149777 | A1* | 10/2002 | Schreiber ........... G01B 9/02061 356/452 |
| 2004/0037626 | A1 | 2/2004 | Awtar et al. |
| 2012/0120404 | A1 | 5/2012 | Coffin |
| 2012/0120405 | A1 | 5/2012 | Coffin |
| 2012/0120409 | A1 | 5/2012 | Coffin |
| 2013/0335737 | A1* | 12/2013 | Stein .............................. 356/326 |
| 2014/0061420 | A1* | 3/2014 | Kaufman et al. ............. 248/469 |

FOREIGN PATENT DOCUMENTS

JP 2005017468 A * 1/2005

OTHER PUBLICATIONS

Chen, Shih-Chi et al. "Design of an Ultra Precision Diaphragm Flexure Stage for Out-of-Plane Motion Guidance". ASME 2004 International Design Engineering Technical Conferences and Computers and Information in Engineering Conference, vol. 2, Paper No. DETC2004-57401, Sep. 28-Oct. 2, 2004, pp. 1015-1021.*

* cited by examiner

*Primary Examiner* — Michael A Lyons
(74) *Attorney, Agent, or Firm* — Luis Figarella (57) ABSTRACT

A mechanism that allows for precise motion of the optics of an interferometer is comprised by two or more diaphragm flexures having high lateral stiffness, creating a superior performing Michelson interferometer. When coupled with precise precision control of a mirror surface and a reference laser, the above creates a superior performing Fourier transform spectrometer.

4 Claims, 7 Drawing Sheets

(Prior Art)

MECHANISM FOR MOVEMENT OF A MIRROR IN AN INTERFEROMETER, AN INTERFEROMETER INCORPORATING THE SAME AND A FOURIER TRANSFORM SPECTROMETER INCORPORATING THE SAME

CROSS-REFERENCE TO RELATED APPLICATIONS

This application claims priority to U.S. Provisional patent application Ser. No. 61/818,009 titled "Mechanism for Movement of a Mirror in an Interferometer, an Interferometer Incorporating the Same and a Fourier Transform Spectrometer Incorporating the Same", filed on May 1, 2013 the disclosure of which is herein incorporated by reference in its entirety.

PATENTS CITED

The following documents and references are incorporated by reference in their entirety, "Continuous Scanning Interferometers for Mid-infrared Spectrometry", by Richard S. Jackson, in The Handbook of Vibrational Spectroscopy, Ed John M. Chalmers and Peter R. Griffiths, Pub John Wiley & Sons Ltd, 2002, Atwar et al (US Pat. Appl. No. 2004/0037626), Coffin (U.S. Pat. No. 5,896,197), Carangelo et al (U.S. Pat. No. 5,486,917), Simon et al (U.S. Pat. No. 5,309,217), Curbelo et al (U.S. Pat. No. 4,828,367), Coffin (US Pat. Appl. No. 2012/0120405), Coffin (US Pat. Appl. No. 2012/0120409) and Coffin (US Pat. Appl. No. 2012/0120404).

FIELD OF THE INVENTION

The present invention pertains to interferometers, and in particular to a Michelson type interferometer.

DESCRIPTION OF THE RELATED ART

A Michelson interferometer is a two beam interferometer that is widely used in Fourier transform spectrometers. These spectrometers are used to obtain spectra over a wide range of wavelengths, from the far-infrared through the ultraviolet. The Michelson interferometer is an amplitude division two beam interferometer with a single beam splitter.

Figure 1A:
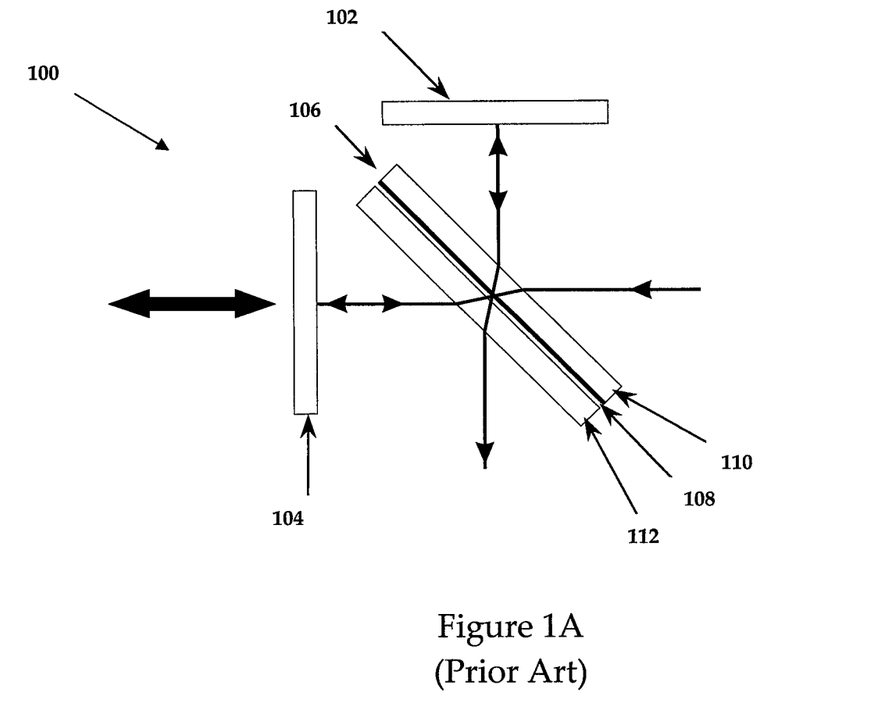
FIG. 1A shows a prior art illustration of a Michelson interferometer.

There are many design variations of Michelson interferometers, but the simplest design 100 is shown in FIG. 1A (Prior Art). The interferometer consists of a fixed mirror 102, a moving mirror 104, and a beam splitter assembly 106. The beam splitter assembly 106 typically has three parts: a beam splitter coating 108, which is deposited onto a substrate 110, and a compensating plate 112. The input radiation beam is divided by beam splitter 108, into two sub-beams. One sub-beam is reflected back to the beam splitter by mirror 102 along a path of fixed length, and the other sub-beam is reflected back to the beam splitter by a movable mirror 104 along a path of variable length. The two sub-beams are recombined at the beam splitter 106, where they interfere with each other, and are once again split such that one new sub-beam returns along the path of the input radiation, and the other sub-beam exits the interferometer perpendicular to the fixed mirror.

When used in an interferometer, it is usually advantageous to measure the position or velocity, or both, of the movable mirror, and to use this measurement in a feedback loop to the actuator. Depending on the intended application of the interferometer, the measurement may be made using a graduated scale, capacitance, a reference laser, or a number of other means.

Figure 1B:
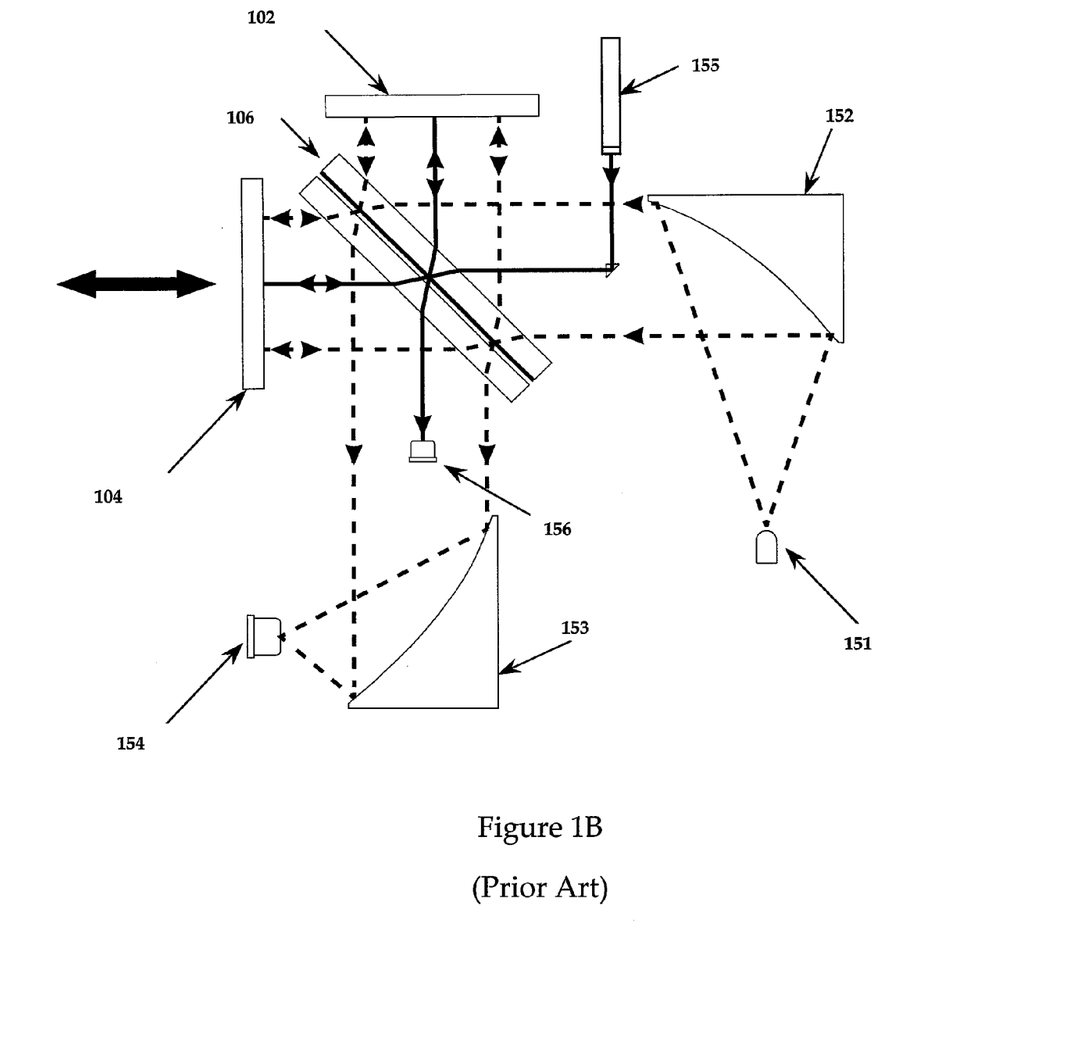
FIG. 1B shows a prior art presentation of the optical layout of a Fourier transform spectrometer that incorporates a Michelson interferometer.

One option is to build a Fourier transform spectrometer that incorporates a Michelson interferometer. FIG. 1B (Prior Art) is an exemplary representation of the optical layout of a Fourier transform spectrometer that incorporates a Michelson interferometer. Light from a broadband source 151 is collimated by a focusing optic 152 and directed into the interferometer, consisting of the beam splitter assembly 106, the fixed mirror 102, and the moving mirror 104. After division and recombination, as described above, the sub beam that exits perpendicular to the fixed mirror is directed to an optical arrangement that permits the light to be transmitted through or reflected from a sample (not shown), and thence to a focusing optic 153 that focuses the light onto a detector 154.

The moving mirror is driven back and forth in a reciprocating fashion to vary the path-length of one of the sub-beams, which causes the interference at the detector to change, resulting in a change in detector output. The detector output as a function of path-length can be converted to a spectrum of the radiation beam using a suitable Fourier transform method. The difference in the optical path length between the two beams is referred to as the optical retardation, which in the design shown is twice the physical retardation of the moving mirror. The resolution of the spectrum depends on the maximum optical retardation, and is usually defined to be the inverse of the optical retardation. A higher resolution spectrum therefore requires a larger range of motion of the moving mirror.

In addition to the beam from the broad band source, in most Fourier transform spectrometers a monochromatic beam from a laser 155 is also directed into the interferometer such that it is substantially collinear (and sometimes coaxial) with the broad band beam used to make the spectral measurement. In a Fourier transform spectrometer the reference laser has the advantage over other measurement methods for position or velocity that it measures the optical retardation of the mirror, rather than the physical retardation.

The exiting sub beam (or, in some configurations, both exiting sub beams) is directed to a detector 156, which measures the intensity changes due to interference as the moving mirror is driven back and forth. The signal from this detector is used to both control the velocity or position of the moving mirror and to determine equal increments of optical retardation. In some Fourier transform spectrometers the signal from the monochromatic source may also be used to control the alignment of one or more optical elements in the interferometer (see for example Coffin (U.S. Pat. No. 5,896,197)).

The optical components in FIG. 1A must be accurately aligned relative to each other, and the moving mirror 104, must maintain optical alignment relative to the fixed mirror 102, during the entire range of travel. The moving mirror has six degrees of freedom: three translational and three rotational. Movement in one of these is required, to change the optical path difference between the two arms of the interferometer (also referred to as the optical retardation). Movement in the other degrees of freedom must either be negligible, or must have negligible effect on the optical alignment, or the alignment must be dynamically maintained using servo systems.

In the plane mirror interferometer shown it is clear that translation of the moving mirror in a direction perpendicular to the direction of travel, referred to as shear, will not affect the optical alignment of the interferometer. However, rotation of the moving mirror about an axis that is perpendicular to the direction of travel, referred to as tilt (a collective term for pitch and yaw, or a combination thereof), does affect the optical alignment because the two output sub-beams are no longer collinear, and therefore do not recombine correctly at the beamsplitter. Unless the moving mirror is exactly perpendicular to the axis of motion, which in practice is never the case, then rotation about the axis of motion (roll) will also cause a misalignment of the interferometer. This is well known, and plane mirror interferometers therefore incorporate some method to prevent roll of the moving mirror.

A key part of the interferometer design is the mechanism that is used to move the mirror. This mechanism must have a sufficient range of motion, and must allow for very accurate movement of the mirror over the entire range of travel. This requirement for accuracy is twofold. First, the mechanism must have negligible undesired translational or rotation motions. Second, the travel must be very smooth, because otherwise accurate control of the position or speed of the moving mirror is difficult. It is also desirable that the mechanism is relatively inexpensive, and also that it have an expected lifetime that is much greater than the lifetime of the instrument in which it will be used. It is difficult to achieve all of these objectives with one design, and therefore many different mechanisms have been used.

A precision air bearing has been used in a number of Fourier transform spectrometers, but it is expensive and requires a supply of compressed air. The required accuracy has been reduced in some designs by using an electronic control system to dynamically maintain alignment of the interferometer, but the mechanism required for this is complicated and expensive. Coffin (U.S. Pat. No. 5,896,197) and Curbelo et al (U.S. Pat. No. 4,828,367) teach bearings that do not need compressed air, but these bearings have sliding parts that are in contact and therefore prone to wear. Such wear is undesirable because it can lead to changes in optical alignment or undesirable motions of the moving mirror, resulting in reduced system performance. Further, in a Fourier transform spectrometer the moving mirror is usually scanned at constant velocity, and even small errors in velocity can cause noise or artefacts in the measured spectra. Sliding or rolling bearings are inherently prone to such velocity errors, because the surfaces of the bearings are never perfectly smooth.

So called "porch-swing" mechanisms have also been used, in which elements are joined at four pivot points to form a parallelogram. One side of the parallelogram can move relative to the other side, so that a mirror fixed perpendicular to the direction of motion undergoes a motion in which the mirror maintains accurate optical alignment throughout the range of travel. However, these mechanisms are expensive to produce because they require four (or in some variations, eight) precision bearings at the pivot points. Carangelo et al (U.S. Pat. No. 5,486,917) teaches a mechanism based on flexures that can provide very linear motion, but it is complex, and therefore costly to produce.

Because of the sensitivity of the optical alignment of the simple plane mirror interferometer shown in FIG. 1A to undesired motions in the moving mirror, many variations of the Michelson interferometer have been designed in which the optical alignment is less sensitive to undesired motions, for example the designs described in "Continuous Scanning Interferometers for Mid-infrared Spectrometry, by Richard S. Jackson, in The Handbook of Vibrational Spectroscopy, Ed John M. Chalmers and Peter R. Griffiths, Pub John Wiley & Sons Ltd, 2002".

In all of these designs an optical element or assembly is either translated or rotated in one degree of freedom to vary the path length of one sub-beam relative to the other. In all designs it is necessary that either this translation or rotation does not affect the optical alignment of the interferometer, or the alignment must be maintained dynamically during the scan using servo systems. Further, translation or rotation in all the other degrees of freedom must either be negligible, or must not affect the interferometer alignment, or must be dynamically controlled using servo systems to maintain alignment.

To achieve these goals different designs have traded certain desirable properties for others. For example, the two plane mirrors shown in FIG. 1A can be replaced with two cube-corner retro-reflectors. Because the reflected beam from such a retro-reflector is always parallel to the incident beam, the interferometer alignment is then not sensitive to tilt of the moving mirror. However, it is then sensitive to shear of the moving mirror, although this is less of a problem than tilt is with the plane mirror design.

Although the use of cube-corner retro-reflectors reduces the sensitivity of the interferometer alignment to undesired motions of the moving mirror, the retro-reflectors must be of very high precision, and are therefore expensive. Further, the mass of a cube-corner retro-reflector is much greater than that of a plane mirror, which reduces the achievable scan speed and the ability of the servo systems to control velocity or position in the presence of external vibration, and requires a higher power, more expensive control system to actuate the moving mirror.

Figure 2:
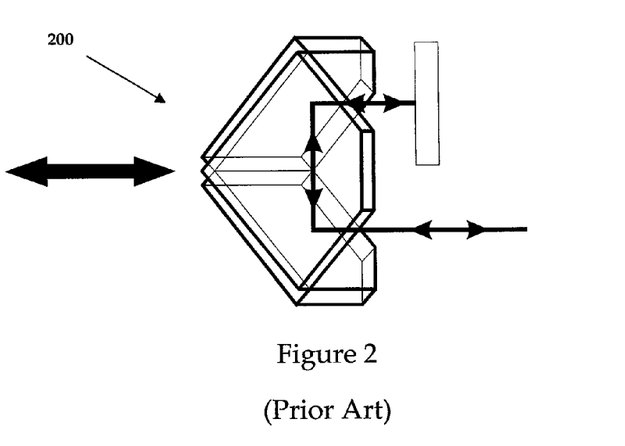
FIG. 2 shows how the plane mirror can be replaced with a combination of a cube-corner retro reflector and a plane mirror, according to the prior art.

In another variation, the plane mirror 104 in FIG. 1 can be replaced with a combination of a cube-corner retro-reflector and a plane mirror, as shown 200 in FIG. 2 (Prior Art). The path-length is then varied by moving the cube-corner retro-reflector. In this configuration the alignment of the interferometer is insensitive to either shear or tilt of the moving mirror. However, the diameter of the cube-corner retro-reflector must be twice that of the beam in the interferometer, further increasing the cost and the mass of the moving mirror. Other designs are even more complex, for example the interferometer disclosed in Simon et al (U.S. Pat. No. 5,309,217), which uses two cube-corner retro-reflectors on a rotating mechanism. The alignment of this interferometer is very stable, but it requires two expensive retro-reflectors, and the rotating mechanism is very massive.

In co-filed US applications US 2012/0120405 and US 2012/0120409 as well as in US application US 2012/0120404 Coffin teaches various mechanisms in which one or more optical component is mounted using one or more diaphragm flexures such that the optical retardation can be changed and the optical component or components can be aligned using servo systems. These mechanisms include a mirror mounted on a single flexure, a beam splitter mounted on a single flexure, and a beam splitter mounted on a single flexure with a pair of mirrors mounted on dual flexures.

However, in contrast to the present invention, the flexures are specified to be "resilient", such that they provide shock and vibration isolation to the optical components, and also allow for the movement of the optical components in more than one degree of freedom. Although these mechanisms do provide the benefit of shock and vibration isolation, because the flexures are resilient'complex servo systems are necessary to maintain optical alignment of the interferometer. Such servo systems are undesirable, because they add both complexity and cost, and as noted by Coffin, they have a limited bandwidth and therefore cannot compensate for all possible alignment errors.

It would therefore be desirable to have a mechanism for the moving mirror that is characterized by smooth motion that is substantially uniaxial, is inexpensive to fabricate, and has a very long expected life. It would also be desirable if reasonable levels of vibration did not affect the alignment of the moving mirror mounted on the mechanism. Such a mechanism could be used to build a Michelson interferometer in which the moving mirror is a single plane mirror, which is both inexpensive and light, without the need for servo systems to maintain alignment during operation.

SUMMARY OF THE INVENTION

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

All references, including any patents or patent applications cited in this specification are hereby incorporated by reference. No admission is made that any reference constitutes prior art. The discussion of the references states what their authors assert, and the applicants reserve the right to challenge the accuracy and pertinence of the cited documents. It will be clearly understood that, although a number of prior art publications are referred to herein, this reference does not constitute an admission that any of these documents form part of the common general knowledge in the art.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

In one aspect the invention is about a Michelson interferometer comprising a fixed mirror, a beam splitter assembly and a movable mirror mounted on two or more diaphragm flexures, said flexures having high lateral stiffness that allow for movement of the mirror and wherein said moveable mirror is under closed loop control. In another aspect said interferometer's closed loop control primarily controls the velocity of said movable mirror. In yet another aspect said interferometer's closed loop control is derived from a reference laser that also passes through said interferometer. In one aspect said interferometer's closed loop control primarily controls the position of said movable mirror, and the undesirable effects of resonance are mitigated by one or more of mechanical damping, electronic damping and/or a compensating filter.

In another aspect said interferometer's closed loop control is derived from a reference laser that also passes through said interferometer. In yet another aspect said interferometer's flexures allow for substantially uniaxial movement of said movable mirror. In another aspect said interferometer's closed loop control primarily controls the velocity of said movable mirror. In another aspect said interferometer's closed loop control primarily controls the position of said movable mirror, and the undesirable effects of resonance are mitigated by one or more of: mechanical damping, electronic damping and/or a compensating filter. In another aspect said interferometer's diaphragm flexures are compound flexures that incorporate two or more component flexures, such that the range of motion is increased.

In one aspect the invention is about a Fourier transform spectrometer comprising a Michelson interferometer having a movable mirror mounted on two or more diaphragm flexures, said flexures having high lateral stiffness that allows for movement of said mirror and wherein said moveable mirror is under closed loop control. In another aspect said spectrometer's closed loop control primarily controls the velocity of said movable mirror and said closed loop control is derived from a reference laser that also passes through said interferometer. In yet another aspect said spectrometer's closed loop control primarily controls the position of said movable mirror, said closed loop control is derived from a reference laser that also passes through said interferometer, and undesirable effects of resonance are mitigated by one or more of: mechanical damping, electronic damping, and/or a compensating filter.

In another aspect said spectrometer's flexures allow for substantially uniaxial movement of said movable mirror. In yet another aspect said spectrometer's closed loop control primarily controls the velocity of said movable mirror and said closed loop control is derived from a reference laser that also passes through said interferometer. In another aspect said spectrometer's closed loop control primarily controls the position of said movable mirror, said closed loop control is derived from a reference laser that also passes through said interferometer, and undesirable effects of resonance are mitigated by one or more of: mechanical damping, electronic damping, and/or a compensating filter. In another aspect said spectrometer's diaphragm flexures are comprised of compound flexures that incorporate two or more component flexures, such that the range of motion is increased. In yet another aspect said spectrometer's closed loop control primarily controls the velocity of said movable mirror and said closed loop control is derived from a reference laser that also passes through said interferometer.

Other features and advantages of the present invention will become apparent upon examining the following detailed description of an embodiment thereof, taken in conjunction with the attached drawings.

The above-described and other features will be appreciated and understood by those skilled in the art from the following detailed description, drawings, and appended claims.

DETAILED DESCRIPTION OF THE PREFERRED EMBODIMENT

To provide an overall understanding of the invention, certain illustrative embodiments and examples will now be described. However, it will be understood by one of ordinary skill in the art that the same or equivalent functions and sequences may be accomplished by different embodiments that are also intended to be encompassed within the spirit and scope of the disclosure. The compositions, apparatuses, systems and/or methods described herein may be adapted and modified as is appropriate for the application being addressed and that those described herein may be employed in other suitable applications, and that such other additions and modifications will not depart from the scope hereof.

Simplifications or omissions may be made to avoid obscuring the purpose of the section. Such simplifications or omissions are not intended to limit the scope of the present invention.

As used in the specification and claims, the singular forms "a", "an" and "the" include plural references unless the context clearly dictates otherwise. For example, the term "a transaction" may include a plurality of transaction unless the context clearly dictates otherwise. As used in the specification and claims, singular names or types referenced include variations within the family of said name unless the context clearly dictates otherwise.

Certain terminology is used in the following description for convenience only and is not limiting. The words "lower," "upper," "bottom," "top," "front," "back," "left," "right" and "sides" designate directions in the drawings to which reference is made, but are not limiting with respect to the orientation in which the modules or any assembly of them may be used.

We have noted above the limitations of the Prior Art as shown in FIGS. 1A, 1B and 2. Referring to additional Prior Art FIG. 3A and FIG. 3B, we see example diaphragm flexures 300 made from a stiff sheet of material in which a pattern of cuts 306 allow the center of the flexure 302 to be deformed relative to the edge of the flexure 304. These flexures have three unconstrained degrees of freedom. If we designate the z-axis as the axis perpendicular to the plane of the drawing, and the x and y-axes as orthogonal axes in the plane of the drawing, then the center of the flexures can be translated along the z-axis, or rotated about either the x-axis or the y-axis, relative to the edge of the flexures.

Figure 3A:
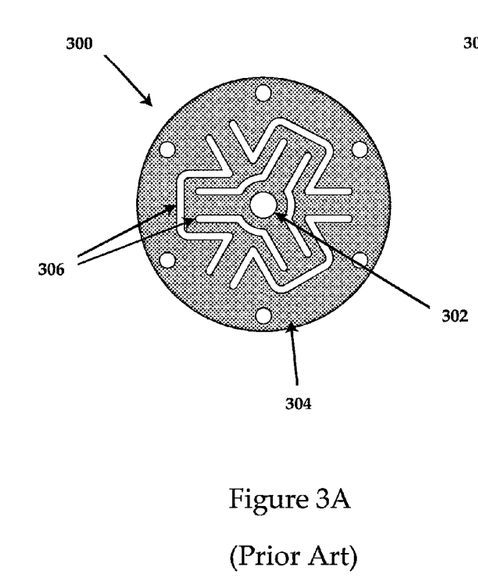
FIGS. 3A-3B shows example diaphragm flexures that exhibit no parasitic translational or rotational motion when the center of the flexure is deformed relative to the edge, according to the prior art.
Figure 3B:
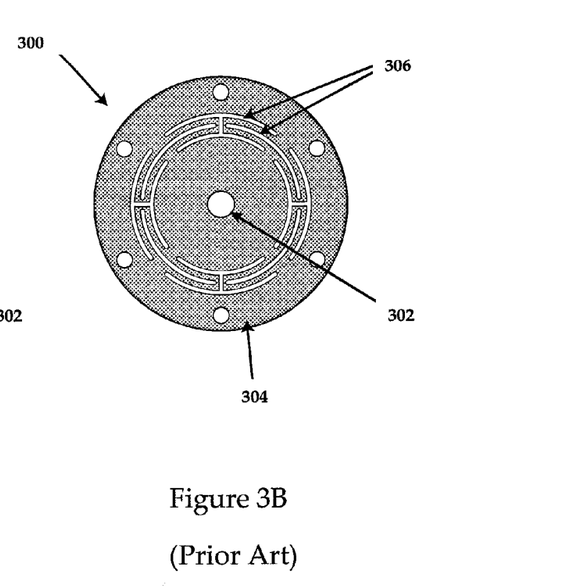

The three constrained degrees of freedom are translation along either the x-axis or the y-axis (i.e. they have high lateral stiffness) and rotation about the z-axis. An important aspect of these flexure designs is that they do not exhibit any parasitic motions in the constrained degrees of freedom. Here parasitic motions are defined as motions in a constrained degree of freedom generated in response to a motion in an unconstrained degree of freedom. These are only two examples of diaphragm flexures that have no parasitic motions. Other flexure designs that have high lateral stiffness and exhibit no parasitic rotational or translation motions are possible, for example the designs described in Atwar et al (US Pat. Appl. No. 2004/0037626). Such flexures can be made from any suitably stiff material that might normally be used to make springs, including metals, polymers, and composites.

Many flexure designs exist that have parasitic rotation about the direction of motion, but for the reasons described above these are not suitable for a Michelson interferometer in which the moving mirror is a plane mirror. Flexures which exhibit parasitic translational motion (i.e. a parasitic motion perpendicular to the desired direction of motion) could in principle be used in a Michelson interferometer in which the moving mirror is a plane mirror, but unless the directions of translational motion of the two flexures are accurately aligned then the moving mirror will exhibit tilt during motion. It is therefore desirable to use flexures that do not exhibit either parasitic rotational motion or parasitic translational motion.

Figure 4:
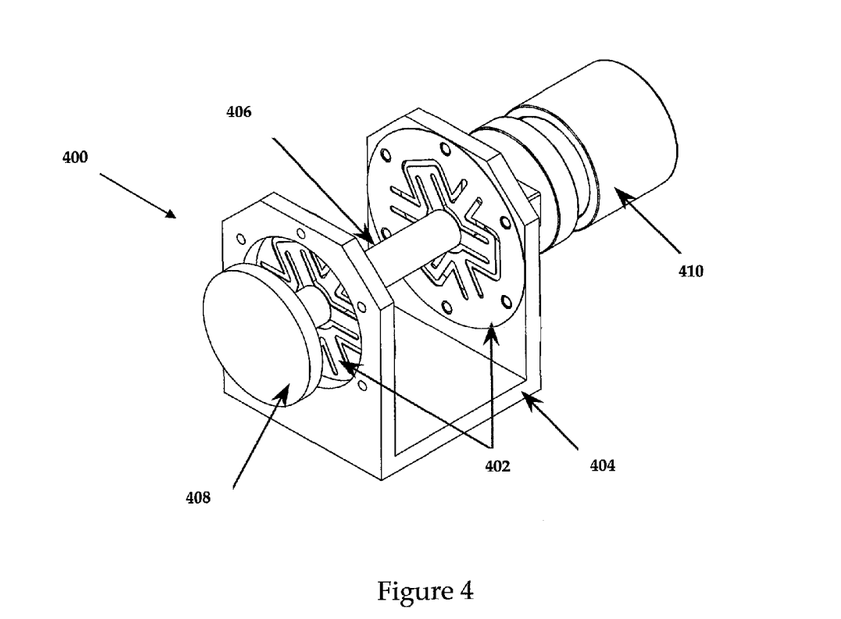
FIG. 4 shows the mechanical layout of the mechanism, according to an exemplary embodiment of the invention.

FIG. 4 shows the mechanical layout of the proposed mechanism 400 according to an exemplary embodiment. The mechanism has two diaphragm flexures 402 mounted to a rigid frame 404 such that they are parallel, concentric, and held a fixed distance apart, but while two are shown, two or more such flexures may be used. A connecting rod 406 passes through, and is attached to, the center of both flexures. As described in Atwar et al (US Pat. Appl. No. 2004/0037626), if the two diaphragm flexures are designed such that deformation in the desired direction does not cause parasitic translational or rotational motions, the motion of such an assembly is highly uniaxial. A plane mirror 408 and an actuator 410 that can be used to drive the mirror back and forth relative to the frame are attached to opposite ends of the connecting rod. The actuator is typically a voice coil, but could be any actuator that is capable of producing the desired motion.

As described above, the resolution of a Fourier transform spectrometer depends on the maximum optical retardation of the moving mirror. For most measurements of liquids and solids a resolution of 4 $cm^{-1}$ is usually considered adequate. To achieve this resolution the maximum optical retardation must be 2.5 mm, and therefore the maximum physical retardation must be 1.25 mm. The maximum deflection of the diaphragm flexures clearly depends on the details of their design, and in particular their overall size, but a deflection of 1.25 mm is readily achievable with moderate sized flexures (approximately 50 mm diameter) of the designs shown in FIG. 3. If a higher resolution is required than is possible with reasonably sized flexures then compound flexures may be employed.

Figure 5A:
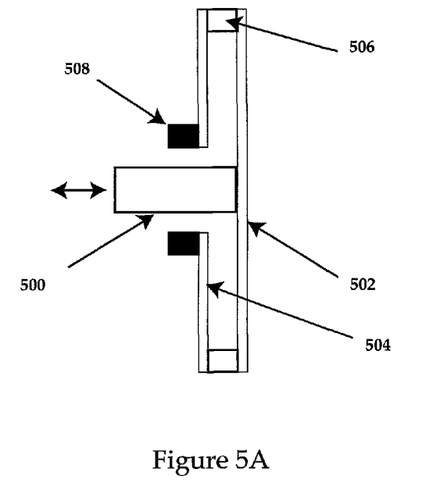
FIGS. 5A-5B show compound diaphragm flexures that allow for an increased range of motion.
Figure 5B:
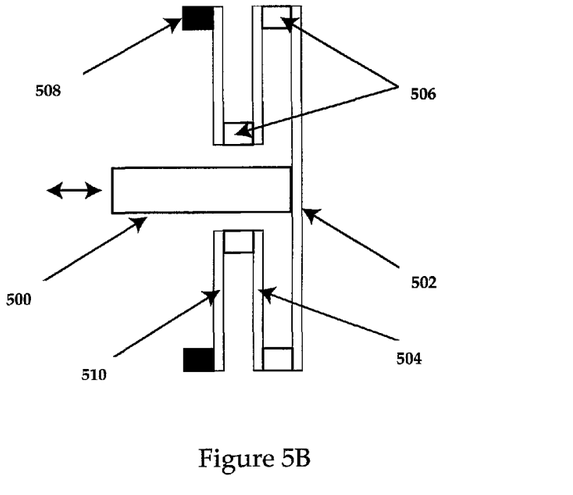

FIGS. 5A-5B show the design for double and triple compound flexures. The connecting rod 500 is attached to the center of a first component diaphragm flexure 502. The edge of the said first component diaphragm flexure is attached to the edge of a second component 504 diaphragm flexure via a thin, stiff, ring, 506. The center of the second component 504 diaphragm flexure is attached either to the rigid frame 508, or to the center of a third component diaphragm flexure 510 in a similar fashion, the edge of which is attached to the rigid frame 508.

The second and third component diaphragm flexures may be of essentially the same design as the first diaphragm flexure, or they may of a different design, as long the different design also does not exhibit parasitic motions. It should be appreciated that the drawings are not to scale, and in practice the rings 506 would be as thin as possible while still allowing the necessary deflection of the component diaphragm flexures. Although compound flexures using two or three component flexures have been described it is clear that any number of additional flexures could be included, each of which increases the range of motion of the compound flexure, but results in some loss of lateral stiffness.

It should be realized that although the mechanism described above can be used in an interferometer in which the moving mirror is a plane mirror, other designs that utilize translational motion to change the path length in one arm of the interferometer would also benefit from this design. For example, in the case where the two plane mirrors are replaced with cube-corner retro-reflectors, as described above, the mechanism has the advantages that it will introduce negligible shear to the moving mirror, is inexpensive to produce, has very smooth motion, and has a very long life.

In the example given above in which the moving plane mirror is replaced by a combination of a plane mirror and a cube-corner retro-reflector parasitic motions that lead to tilt or shear are not important, but even in this example the mechanism has the advantages that it is inexpensive to produce, has very smooth motion, and has a very long life. In this design it will be appreciated that the flexures could in fact be of a design that has high lateral stiffness but exhibits parasitic motions, but there would be no advantage in using such flexures over ones that do not exhibit parasitic motions. It should be noted that one advantage of this design is that the optical retardation is four times the physical retardation. Therefore, for a given deformation of the flexures (i.e. for a given physical retardation) a Fourier transform spectrometer that utilizes this design would be capable of twice the spectral resolution of one that uses a moving plane mirror.

As already discussed, in a Fourier transform spectrometer the moving mirror is usually driven at a constant velocity for most of the range of motion, and closed loop control is necessary to achieve an accurate velocity. Such closed loop control is also used to minimize the effects of external perturbations such as vibration and temperature changes, to which an interferometer is very sensitive.

Figure 6:
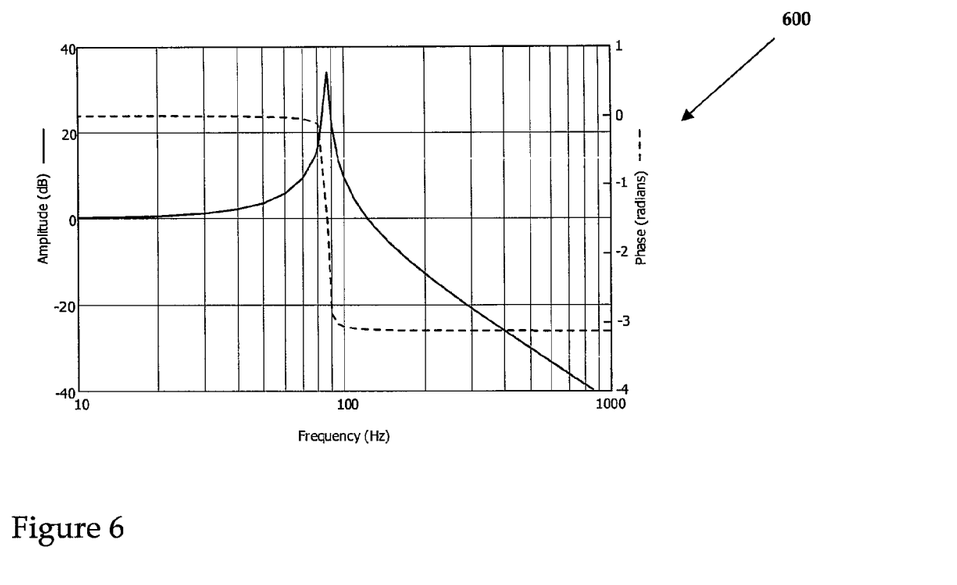
FIG. 6 shows the amplitude and phase of the actual deflection relative to the desired deflection as a function of driving frequency, according to an exemplary embodiment of the invention.

Because the mechanism shown in FIG. 4 consists of a mass mounted on spring flexures, it has a strong resonance at its natural frequency. When the position is to be controlled, this resonance poses a problem for closed loop control system. FIG. 6 shows the amplitude and phase plot 600 of the actual deflection relative to the desired deflection as a function of driving frequency according to an exemplary embodiment. Such frequencies could occur from, for example, external vibrations.

As is well known, at the resonant frequency a very small input to the actuator will produce a very large deflection, and the phase of the response abruptly changes by 180 degrees. As is well known, this response behavior makes closed loop control of the position of the moving mirror difficult. In particular, the interferometer will be susceptible to external perturbations, for example vibration. Above the resonant frequency there is also a second order roll-off, which limits the frequency response of the drive system. It is possible to reduce the undesirable effects of the resonance by damping, which reduces the amplitude of the deflection at the resonant frequency and makes the phase shift more gradual. Such damping may be either mechanical, by a number of known means, or electronic, or a combination of the two. However, damping has the undesirable effect of further suppressing the high frequency response.

Figure 7:
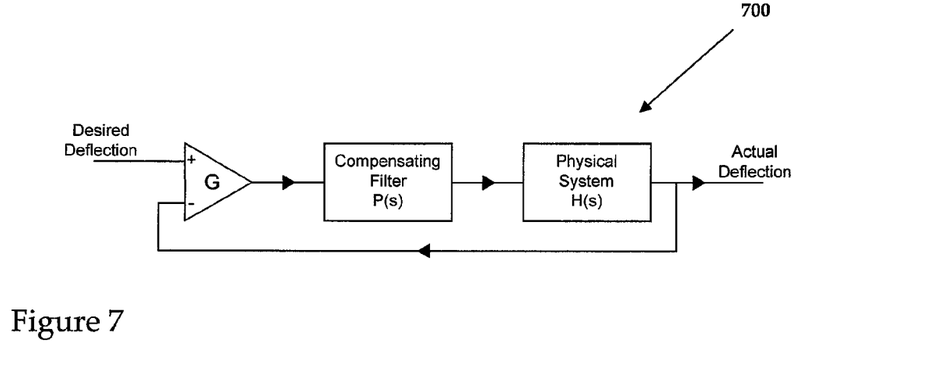
FIG. 7 shows a block diagram that illustrates how such a filter may be used in a closed loop control system, according to an exemplary embodiment of the invention.

A better approach is to use an electronic filter to compensate for the mechanical resonance. FIG. 7 shows a block diagram that illustrates how such a filter may be used in a closed loop control system 700. Assuming a simple resonance, the response of the physical system, H(s), to an input signal can be expressed as;

$$H(s) = \frac{1}{\left(\frac{s}{2 \cdot \pi \cdot f_R}\right)^2 + \frac{1}{Q_R} \cdot \left(\frac{s}{2 \cdot \pi \cdot f_R}\right) + 1}$$

where s is the complex frequency, $Q_R$ is the quality factor of the resonance, and for a high quality factor $f_R$ is approximately equal to the center frequency of the resonance. H(s) has two complex conjugate poles, and we therefore need a filter that has a complex zeros to cancel these poles.

The filter also needs two real poles that allow the filter performance to be adjusted. Such a filter can be expressed as;

$$P(s) = \frac{\left(\frac{s}{2 \cdot \pi \cdot f_0}\right)^2 + \frac{1}{Q} \cdot \left(\frac{s}{2 \cdot \pi \cdot f_0}\right) + 1}{\left(\frac{s}{2 \cdot \pi \cdot p_1} + 1\right) \cdot \left(\frac{s}{2 \cdot \pi \cdot p_2} + 1\right)}$$

where Q is the quality factor of the filter, $p_1$ and $p_2$ are the frequencies of the poles, and for a high quality factor $f_0$ is approximately equal to the center frequency of the filter. For optimum compensation Q is made equal to $Q_R$, and $f_0$ is made equal to $f_R$. This can be achieved by either setting Q and $f_0$ to predetermined values, or by additional electronics that will automatically tune the filter to the optimum values. With gain G, the closed loop gain of the system with the compensating filter is given by;

$$C(s) = \frac{G \cdot H(s) \cdot P(s)}{1 + G \cdot H(s) \cdot P(s)}$$

Figure 8:
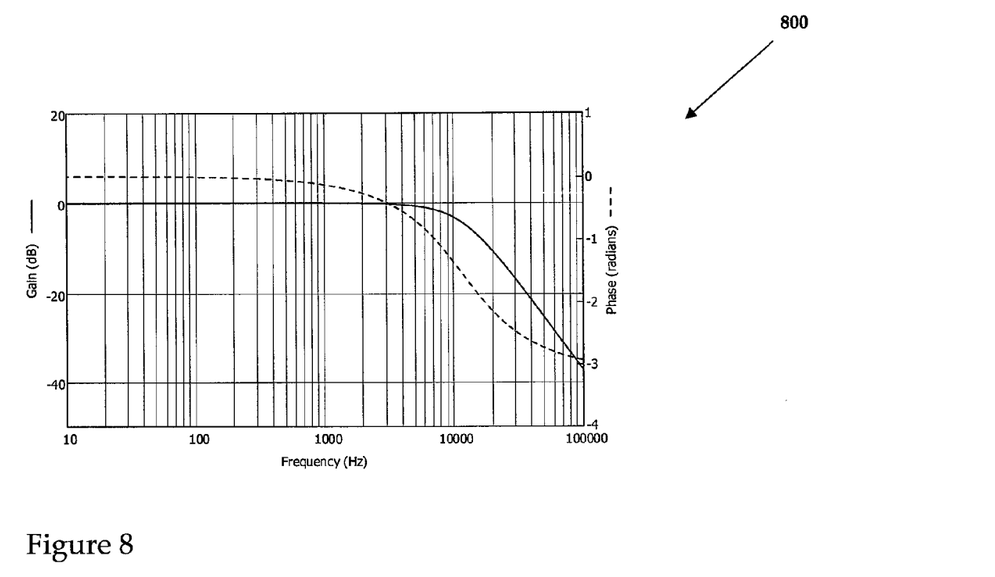
FIG. 8 shows the closed loop gain and phase of the actual deflection relative to the desired deflection as a function of driving frequency when the compensating filter is employed, according to an exemplary embodiment of the invention.

FIG. 8 shows the plot 800 of closed loop gain and phase of the actual deflection relative to the desired deflection as a function of driving frequency, with the compensating filter included in the signal path, and $p_1$ and $p_2$ set to 70 Hz and 20 kHz, respectively. Both the gain and phase are substantially flat over a much greater range of frequencies, therefore the drive system has a much wider frequency response, and the interferometer is less susceptible to external perturbations.

Figure 9:
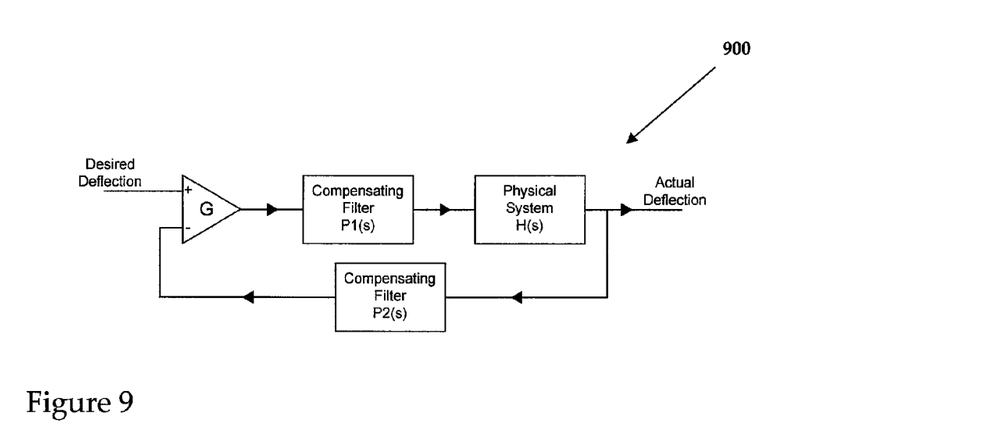
FIG. 9 shows a block diagram that illustrates an alternative design is to split the compensating filter between the signal and feedback paths, according to an exemplary embodiment of the invention.

An alternative design is to split the compensating filter between the signal and feedback paths, as shown in FIG. 9. Whether or not this split is desirable depends on practical considerations such as dynamic range and noise. There are many possible ways to split the filter, but as one example we can keep the notch in the signal path, and move the increase in high frequency gain to the feedback path. P1(s) and P2(s) are then given by;

$$P1(s) = \frac{\left(\frac{s}{2 \cdot \pi \cdot f_0}\right)^2 + \frac{1}{Q} \cdot \left(\frac{s}{2 \cdot \pi \cdot f_0}\right) + 1}{\left(\frac{s}{2 \cdot \pi \cdot f_0}\right)^2 + \sqrt{2} \cdot \left(\frac{s}{2 \cdot \pi \cdot f_0}\right) + 1}$$

$$P2(s) = \frac{\left(\frac{s}{2 \cdot \pi \cdot f_0}\right)^2 + \sqrt{2} \cdot \left(\frac{s}{2 \cdot \pi \cdot f_0}\right) + 1}{\left(\frac{s}{2 \cdot \pi \cdot p_1} + 1\right) \cdot \left(\frac{s}{2 \cdot \pi \cdot p_2} + 1\right)}$$

Figure 10:
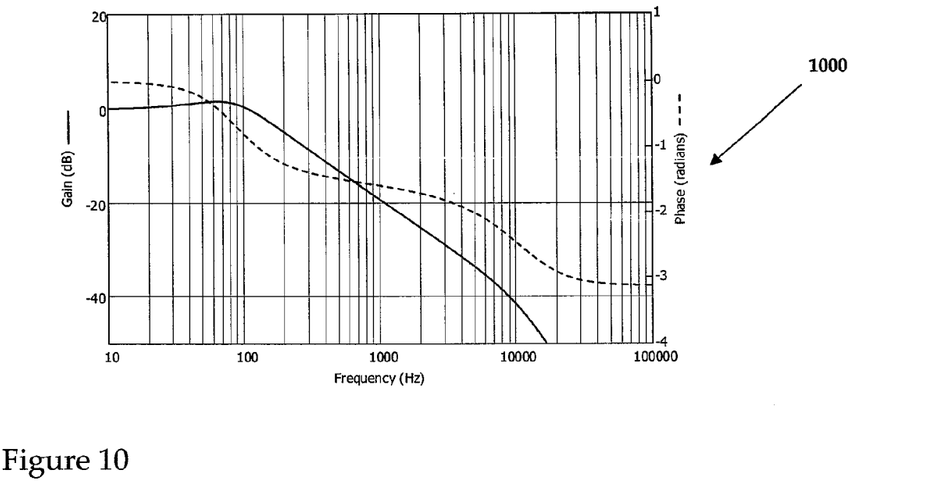
FIG. 10 shows the closed loop gain and phase of the actual deflection relative to the desired deflection as a function of driving frequency when the alternative compensating filter is employed, according to an exemplary embodiment of the invention.

The total gain around the loop is the same as before, and therefore the response of the system to external perturbations in unaffected by the split. The response plot 1000 of the drive to the input signal (i.e. the "desired deflection") is shown in FIG. 10. In it we see that there is no significant resonance, but the frequency response of the drive to the input signal has been reduced compared to the un-split filter.

Figure 11:
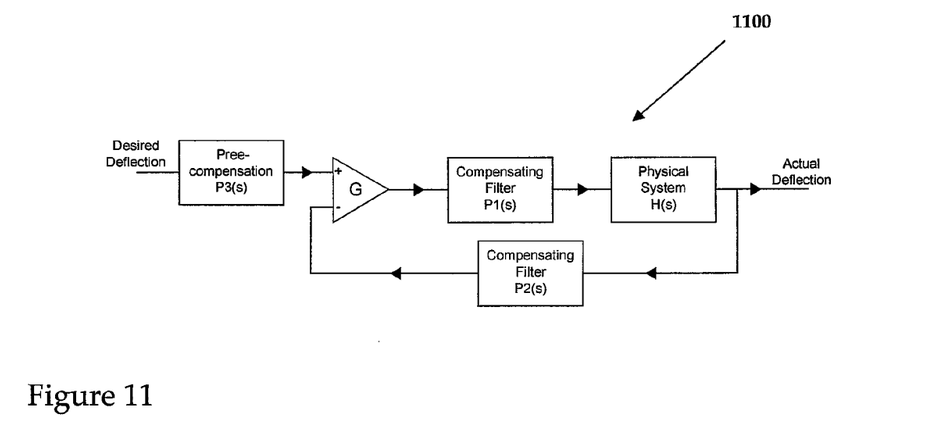
FIG. 11 shows the design when a pre-compensating filter is included to boost the high frequency gain in the signal path, according to an exemplary embodiment of the invention.

When the objective is to control the position of the moving mirror this reduction in frequency response is generally not a problem. If it is a problem, for example, because it is desired to be able to step the interferometer from one position to another very rapidly, then in a third variation of the design 1100 a pre-compensating filter can be included to boost the high frequency gain in the signal path, as shown in FIG. 11.

Depending on the intended application of the interferometer, the pre-compensation, P3(s), may have the same form as P2(s), or it may be different. In all the variations of a compensating filter described values must be chosen for the quality factor, Q and frequency, $f_0$. For optimum compensation Q should be made equal to $Q_R$, and $f_0$ should be made equal to $f_R$. However, the performance of the filter is very insensitive to the actual value of Q chosen, and an approximate match is adequate. A mismatch between $f_o$ and fr has a greater effect on performance, but the effect is not great for errors of a few percent, which in practice is easily achievable.

Conclusion

In concluding the detailed description, it should be noted that it would be obvious to those skilled in the art that many variations and modifications can be made to the preferred embodiment without substantially departing from the principles of the present invention. Also, such variations and modifications are intended to be included herein within the scope of the present invention as set forth in the appended claims. Further, in the claims hereafter, the structures, materials, acts and equivalents of all means or step-plus function elements are intended to include any structure, materials or acts for performing their cited functions.

It should be emphasized that the above-described embodiments of the present invention, particularly any "preferred embodiments" are merely possible examples of the implementations, merely set forth for a clear understanding of the principles of the invention. Any variations and modifications may be made to the above-described embodiments of the invention without departing substantially from the spirit of the principles of the invention. All such modifications and variations are intended to be included herein within the scope of the disclosure and present invention and protected by the following claims.

The present invention has been described in sufficient detail with a certain degree of particularity. The utilities thereof are appreciated by those skilled in the art. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the forgoing description of embodiments.

I claim:

1. A Michelson interferometer, comprising;
a fixed mirror, a beam splitter assembly and a moveable mirror mounted on a connecting rod, said connecting rod connected to two or more diaphragm flexures, said flexures having sufficient lateral stiffness to allow for measurably tilt-free and uniaxial movement of said moveable mirror; wherein said connecting rod is moved by a voice coil;
wherein said moveable mirror's velocity is under closed loop control; and
wherein one or more of said diaphragm flexures are compound flexures that each incorporate two or more component diaphragm flexures, wherein only the edge of said first component diaphragm flexure of each said compound flexure is attached to said connecting rod, and each subsequent component diaphragm is connected only to subsequent concatenated component diaphragm, such that the range of motion is increased.

2. the interferometer in claim 1 wherein;
said closed loop control is derived from the optical interference pattern of a reference laser that also passes through said interferometer.

3. A Fourier transform spectrometer, comprising;
a Michelson interferometer having a moveable minor mounted on a connecting rod, said connecting rod connected to two or more diaphragm flexures;
said flexures having sufficient lateral stiffness to allow for measurably tilt-free and uniaxial movement of said moveable minor;
wherein said moveable minor velocity is under closed loop control; and
wherein one or more of said diaphragm flexures are compound flexures that each incorporate two or more component diaphragm flexures, wherein only the edge of said first component diaphragm flexure of each said compound flexure is attached to said connecting rod, and each subsequent component diaphragm is connected only to subsequent concatenated component diaphragm, such that the range of motion is increased.

4. the Fourier transform spectrometer in claim 3 wherein;
said closed loop control is derived from the optical interference pattern of a reference laser that also passes through said interferometer.

* * * * *